(12) United States Patent
Hamada

(10) Patent No.: US 7,828,446 B2
(45) Date of Patent: Nov. 9, 2010

(54) VIDEO PROJECTOR

(75) Inventor: Shingo Hamada, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 653 days.

(21) Appl. No.: 11/753,285

(22) Filed: May 24, 2007

(65) Prior Publication Data
US 2007/0273840 A1 Nov. 29, 2007

(30) Foreign Application Priority Data
May 25, 2006 (JP) ............... 2006-145617

(51) Int. Cl.
G03B 21/14 (2006.01)
H01H 13/14 (2006.01)
F16M 11/04 (2006.01)

(52) U.S. Cl. .............. 353/70; 353/119; 248/157; 248/188.2; 248/188.8

(58) Field of Classification Search .............. 353/70, 353/101, 119; 200/314, 341, 345; 248/157, 248/188.2, 188.8
See application file for complete search history.

(56) References Cited

U.S. PATENT DOCUMENTS

| | | | |
|---|---|---|---|
| 4,303,815 A | 12/1981 | Ishikawa | |
| 4,354,081 A * | 10/1982 | Serras-Paulet | 200/404 |
| 6,715,890 B2 * | 4/2004 | Huang et al. | 353/119 |
| 6,809,278 B2 | 10/2004 | Tsubaki | |
| 6,923,417 B2 * | 8/2005 | Chang | 248/649 |
| 7,111,948 B2 * | 9/2006 | Lee et al. | 353/119 |
| 7,185,988 B2 * | 3/2007 | Rogers et al. | 353/70 |
| 7,318,570 B2 * | 1/2008 | Lin et al. | 248/188.2 |
| 7,409,271 B2 * | 8/2008 | Lee et al. | 701/1 |
| 7,467,769 B2 * | 12/2008 | Shao et al. | 248/188.2 |
| 7,475,996 B2 * | 1/2009 | Hsu et al. | 353/70 |
| 2002/0113951 A1 | 8/2002 | Huang et al. | |
| 2002/0140909 A1 * | 10/2002 | Tanaka | 353/70 |
| 2002/0153465 A1 * | 10/2002 | Su | 248/404 |
| 2007/0273840 A1 * | 11/2007 | Hamada | 353/70 |

FOREIGN PATENT DOCUMENTS

| | | |
|---|---|---|
| DE | 196 34 051 C1 | 8/1997 |
| DE | 197 03 394 C1 | 3/1998 |
| EP | 1 467 390 A1 | 10/2004 |
| JP | 2000-331560 A | 11/2000 |
| JP | 2004-281291 A | 10/2004 |
| JP | 2006-49068 A | 2/2006 |

OTHER PUBLICATIONS

European Search Report in Application No. 07010272.8—2209/1860495 dated Jul. 22, 2010.

* cited by examiner

Primary Examiner—John R Lee
(74) Attorney, Agent, or Firm—Crowell & Moring LLP

(57) ABSTRACT

An angle adjusting mechanism (3) of a video projector (1) comprises a support (31) which can be pulled out downward from a bottom (2e) of a lower housing member (2b) to protrude a desired height, a lock member (32) to lock movement of the support (31), a link lever (33) to release locking of the support (31) by the lock member (32) when it is moved, and an operation button (35) having a top end portion (35e) inserted into a button hole (2c) of a upper housing member (2a) and movably held on a mounting base (33b) of the link lever (33) in a direction substantially parallel to the top face (2d) on which the button hole (2c) is formed.

4 Claims, 4 Drawing Sheets

VIDEO PROJECTOR

BACKGROUND OF THE INVENTION

1. Field of the Invention

The present invention relates to a video projector which projects images on an external screen, and especially relates to a video projector having angular adjustability to an installation surface.

2. Description of the Related Art

Conventionally, a video projector, which projects images on an external screen on the basis of image signals outputted from a personal computer, for example, has an angle adjusting mechanism to adjust an angle of an optical axis of a projection lens with respect to an installation surface of the video projector so as to project the image on the screen properly. A conventional angle adjusting mechanism is comprised of a rod-shaped support adjustably provided at a front center of a housing of the video projector, for example, to protrude downward from the bottom of the housing and a locking mechanism to lock the movement of the support. The locking mechanism is further linked with a operation button via a link lever to release the locking of the support by the locking mechanism. The support is locked up by the locking mechanism when it protrudes downward from the bottom of the housing of the video projector, so that the support can hold an inclined posture of the video projector. The support and the locking mechanism has a plurality of hooking points corresponding to protruding height of the support from the bottom of the housing, and thus, the angle of the optical axis of the projection lens with respect to the installation surface can be adjusted. When the operation button is operated by a user, the link lever is moved with the motion of the operation button and it releases the locking of the support by the locking mechanism, so that the support will be retracted inside the housing due to weight of the video projector.

In such angle adjusting mechanism of the video projector, the operation button and the link lever are generally independently formed with different materials. Specifically, the inside of the housing of the video projector becomes high temperature due to heat of a light source and so on, so that an element such as the link lever which is disposed in the vicinity of a heat source or required the rigidity is formed of a metal material or a composite resin material. On the other hand, the operation button which is partially exposed outside is formed of a generic resin material in consideration of a manufacturing cost or an appearance design. Alternatively, if the link lever and the operation button were integrally formed, the shape of the integrated member might have become complex and the manufacturing cost thereof be increased. Thus, the operation button and the link lever, which are independently formed, are coupled with a screw, for example, so that the link lever is moved in conjunction with the motion of the operation button. Since the link lever is a movable member, it is held on the housing with a predetermined allowance in consideration of the dimensional tolerance.

By the way, in such a conventional video projector, when vibrations are applied to the video projector, or sounds are outputted at megavolume from a built-in speaker of the video projector, for example, the link lever is resonated in the allowance. The resonance of the link lever further causes frictional contact of the operation button and edge of a button hole of the housing to which the operation button is inserted, so that frictional sounds are generated due to the frictional contacts of the operation button and the edge of the button hole. Such frictional sounds are rudeness to the user.

In addition, the size of the button hole must be selected a little larger that the size of the outer shape of the operation button in consideration of the dimensional tolerances of the housing, the link lever and the operation button manufactured, so that a clearance between the edges of the button hole and the operation button becomes wider, and thus, visual quality of the video projector is deteriorated. Furthermore, the user may feel the operationality of the operation button is not so good, because the allowance of the operation button to the housing may be felt larger.

Japanese Laid-Open Patent Publication No. 2006-49068 discloses a push knob structure that prevents displacement of a support member and a base member. Although this structure shown in 2006-49068 can prevent the inclination of the push knob, it, however, cannot reduce the frictional sounds due to the frictional contacts of the operation button and the edge of the button hole of the housing, as described above. Furthermore, the visual quality of the video projector cannot be increased, even if the structure is applied to the operation button of the video projector.

Japanese Laid-Open Patent Publication No. 2004-281291 discloses a structure that enables to protrude a operation surface of a push button from a button hole into which the push button is inserted and prevents backlash of a push button, even when a center of the push button is discrepant from a guide of a chassis due to location accuracy of the button hole on a front panel is lower. The structure shown in 2004-281291 cannot increase the visual quality of the apparatus, and the mechanism of the push button becomes complex.

SUMMARY OF THE INVENTION

The present invention is perceived to solve the problem described above, and an object of the present invention is to provide a video projector having an angle adjusting mechanism with an operation button, in which a clearance between edges of the operation button and a button hole of a housing into which the operation button is inserted can be made smaller, frictional sounds due to frictional contacts of the operation button and the edge of the button hole can be reduced, a visual quality of the video projector can be increased, and operationality to operate the operation button can be improved.

A video projector in accordance with an aspect of the present invention comprises: a light source; an image forming unit that forms an image with using image data; a projection lens that projects the image formed by the image forming unit to a screen disposed in front of the video projector; an angle adjusting mechanism that adjusts an angle of an optical axis of the projection lens with respect to an installation surface on which the video projector is installed; and a housing that contains the light source, the image forming unit, the projection lens and the angle adjusting mechanism. The housing is comprised of an upper housing member having a button hole formed on a face thereof, and a lower housing member on which the light source, the image forming unit, the projection lens and the angle adjusting mechanism are mounted. The angle adjusting mechanism is further comprised of a support which can be pulled out downward from a bottom of the lower housing member to protrude a desired height, a lock member to lock movement of the support, a link lever to release locking of the support by the lock member when it is moved, and an operation button having a top end portion inserted into the button hole of the upper housing member and movably held on the link lever in a direction substantially parallel to the face on which the button hole is formed.

According to such a configuration, since the operation button is movable held on the link lever in a direction substantially parallel to the face on which the button hole is formed, for example, a top face of the housing, the position of the top end portion of the operation button can be displaced to be adjusted to the position of the button hole, even though the dimensional tolerances of the elements are larger. In other words, the top end portion of the operation button can be inserted into the button hole even when the clearance between the edges of the operation button and the button hole is smaller. Consequently, a clearance between edges of the operation button and a button hole of a housing into which the operation button is inserted can be made smaller, frictional sounds due to frictional contacts of the operation button and the edge of the button hole can be reduced, a visual quality of the video projector can be increased, and operationality to operate the operation button can be improved.

While the novel features of the present invention are set forth in the appended claims, the present invention will be better understood from the following detailed description taken in conjunction with the drawings.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
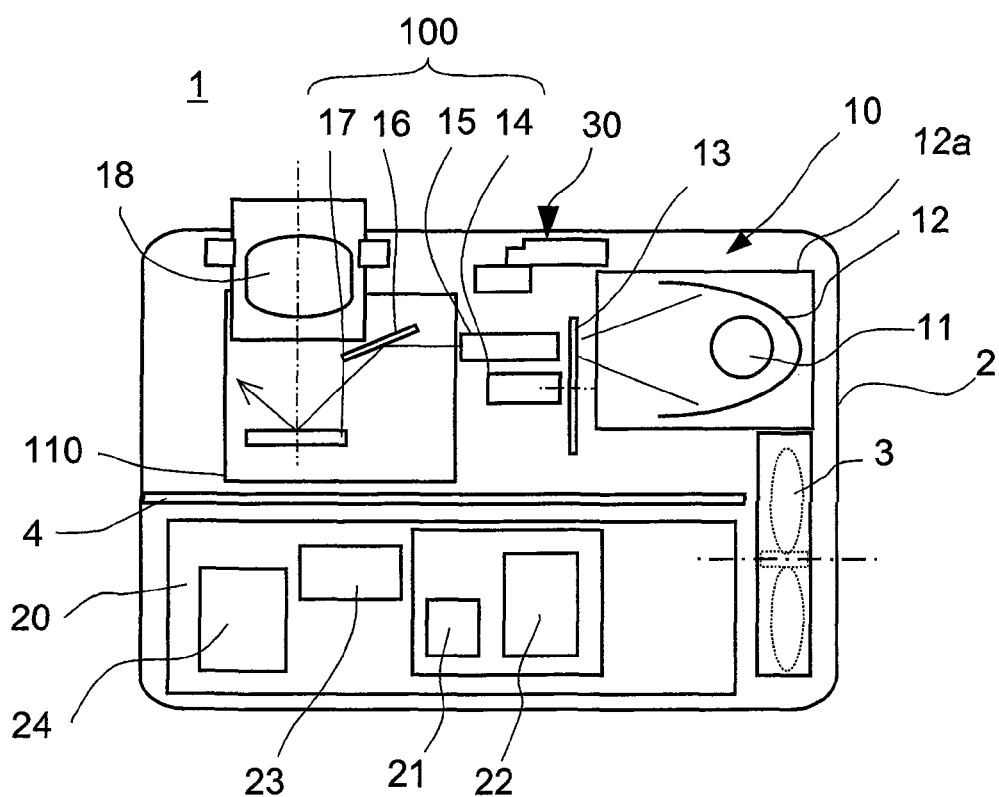
FIG. 1 is a plain sectional view showing a configuration of a video projector in accordance with a preferred embodiment of the present invention.
Figure 2:
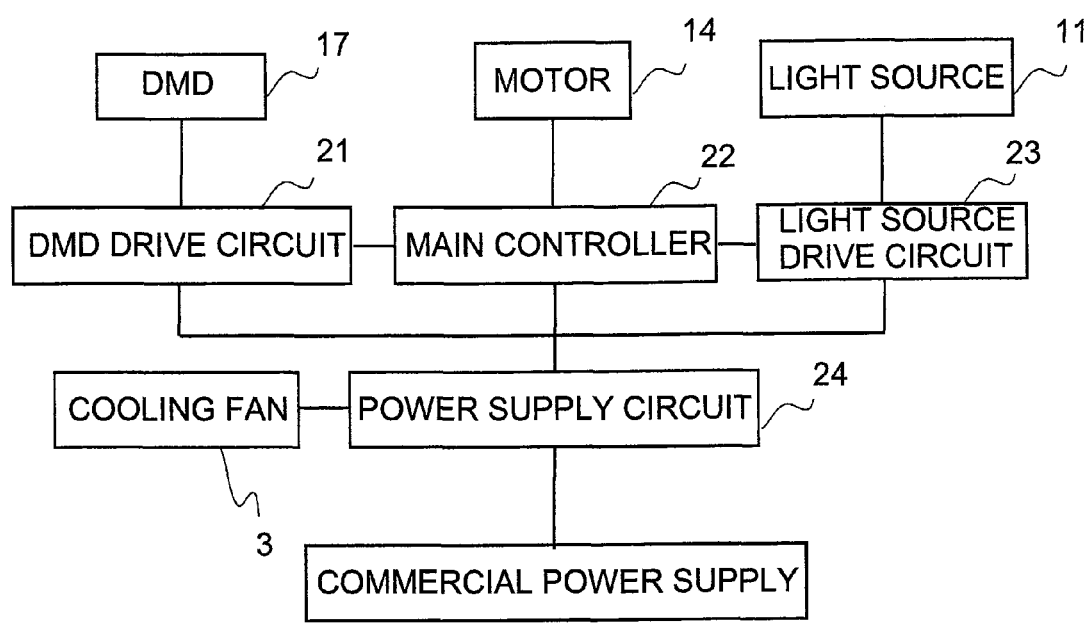
FIG. 2 is a block diagram showing a circuit configuration of the video projector.
Figure 3:
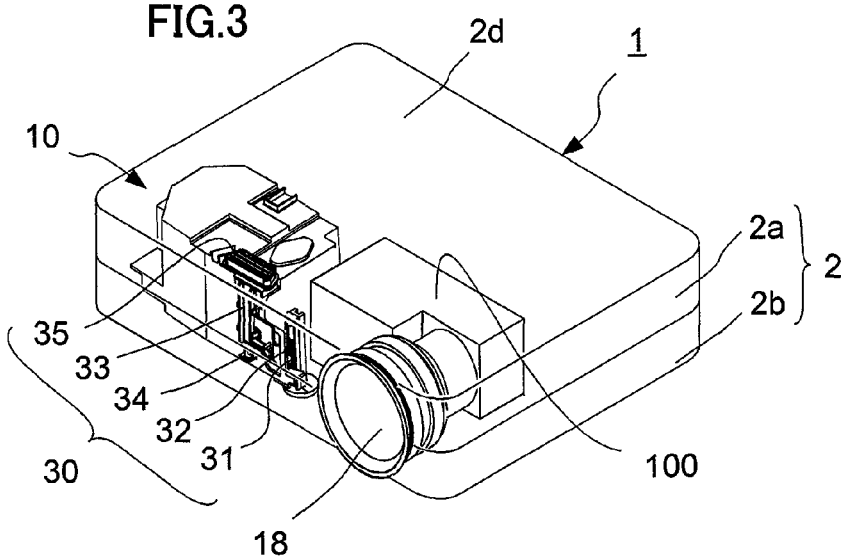
FIG. 3 is a sight through perspective view showing a configuration of the video projector.

A preferred embodiment of a video projector in accordance with the present invention is described below with reference to the drawings. FIG. 1 shows a video projector 1 in accordance with the present invention. FIG. 2 shows a circuit configuration of the video projector 1. FIG. 3 is a sight through perspective view showing a configuration of the video projector 1.

The video projector 1 is used to project an enlarged image on a screen which is located in front of the video projector 1 by using image signals (image data) outputted from a personal computer, a video camera, or the like.

As shown in FIG. 1, the video projector 1 comprises an optical engine 10 that is located on a front side of a housing 2, forms an image by using image signals inputted from outside, and enlarges and projects the image on a screen located in front of the video projector 1, and a controller 20 that is located on a rear side of the housing 2, processes the image signals inputted from outside, and controls the optical engine 10. An angle adjusting mechanism 30, which varies an angle of the housing 2 with respect to an installation surface, that is, the posture of the video projector 1, is provided at a front center portion of the housing 2. As shown in FIG. 3, the housing 2 is comprised of an upper housing member 2a and a lower housing member 2b. The optical engine 10, the controller 20 and the angle adjusting mechanism 30 are initially mounted on the lower housing member 2b. Subsequently, the upper housing member 2a is attached to the lower housing member 2b so that the optical engine 10, the controller 20 and the angle adjusting mechanism 30 are contained in the housing 2.

As shown in FIG. 1, the optical engine 10 includes a light source 11 such as a discharge lamp, for example, a reflector (light collecting member) 12, a color wheel 13, a motor 14, a mirror 16, a DMD (Digital Micromirror Device) 17, a projection lens 18, and so on. The reflector 12 reflects a light, which is outputted backward among lights outputted from the light source 11, to a forward direction, and gathers the lights in a predetermined area. The color wheel 13 is located on a light path of the light outputted from the light source 11, and has color filters corresponding to three primary colors at a certain angular pitch, and is rotated at a constant speed. The motor 14 rotates the color wheel 13 at a constant speed. The optical tunnel 15 of a certain inside diameter faces with the light source across the color wheel 13. The mirror 16 reflects a light flux, which passes through the optical tunnel, in a certain direction. The DMD (Digital Micromirror Device) 17 is located in a light path of the light flux passing through the color wheel 13 and then followed by the optical tunnel 15 and the mirror 16. The DMD 17 is a cluster of micromirrors arranged in two-dimensional pattern, and changes an angle of the micromirrors according to the image signals inputted from outside, and then reflects the light flux, which passes through the color wheel 13, in a certain direction (a first direction) and a second direction excluding the certain direction. The projection lens 18 projects the light flux reflected by the DMD 17 on a screen. The projection lens 18 is a zoom lens that is configured by a plurality of lens elements locations of which are changeable. In the present preferred embodiment, the color wheel 13, the optical tunnel 15, the mirror 16, and the DMD 17 function as an image forming unit 100 which outputs the light flux projected on the screen.

The reflector 12 has a spheroidal shape, for example, and the light source 11 is located adjacent to one focal point of the spheroid, and the color wheel 13 is partially adjacent to the other focus of the spheroid. In FIG. 1, the light source 11 and the reflector 12 which are disposed in a right side of the color wheel 13 are enclosed with a box shaped lamp box 12a and formed as a light source unit separately formed. In contrast, in a left side of the optical tunnel 15, a dark box unit 110 is formed to reduce an impact of a stray light, and an antireflection coating is applied to an inner surface of the dark box unit 110 to absorb a reflected light. In FIG. 1, a partition plate 4 is illustrated to divide a side of the optical engine 10 from a side of the controller 20 in the housing 2. The partition plate 4, however, is not necessary when the video projector 1 is actually manufactured. The partition plate 4 can be substituted for walls of a housing of the light source unit and the dark box unit described above.

The controller 20 includes a DMD drive circuit (control circuit) 21 which drives the DMD 17 by using the image signals, a main controller (control circuit) 22 which wholly controls the video projector 1, a light source drive circuit (control circuit) 23 which drives the light source 11, a power supply circuit 24 which provides electrical power to various units of the video projector 1 including the DMD drive circuit 21, the main controller 22, and the light source drive circuit 23, and a cooling fan 3 which generates a cooling air to cool at least the light source 11 and the power supply circuit 24.

The DMD drive circuit 21 and the main controller 22 consist of a CPU, a ROM, a RAM, and so on, for example. In addition, a noise removal filter or the like is also mounted, if necessary. The light source drive circuit 23 is an inverter circuit which controls the light source 11 such as a discharge lamp to keep the constant electrical power, and consists of a coil, a diode, a FET, and so on. Since the discharge lamp has a low temperature and a low voltage immediately after turned on, a large current may flow in the lamp if the electrical power is controlled to be constant, and thus a lamp life decreases. In order to avoid this trouble, the light source drive circuit 23 performs a warm-up to limit the current flowing in the lamp for a certain period of time after the lamp is turned on. The power supply circuit 24 is a circuit to generate a DC voltage power supply of 12V or 24V, for example, by using an alternate commercial power supply of 100V or 200V, for example, as an input, and consists of a coil, a diode, a FET, and so on.

As shown in FIG. 1, the cooling fan 3 takes an air into an inside of the housing 2 from outside and exhausts hot air caused by an absorption of heat generated in heat sources such as the light source 11, the light source drive circuit 23, the power supply circuit 24, and so on, to the outside of the housing 2. In the configuration shown in FIG. 1, the cooling air generated with the cooling fan 3 is partially led into the side of the optical engine 10 and the rest of the cooling air is led into the side of the controller 20.

Figure 4:
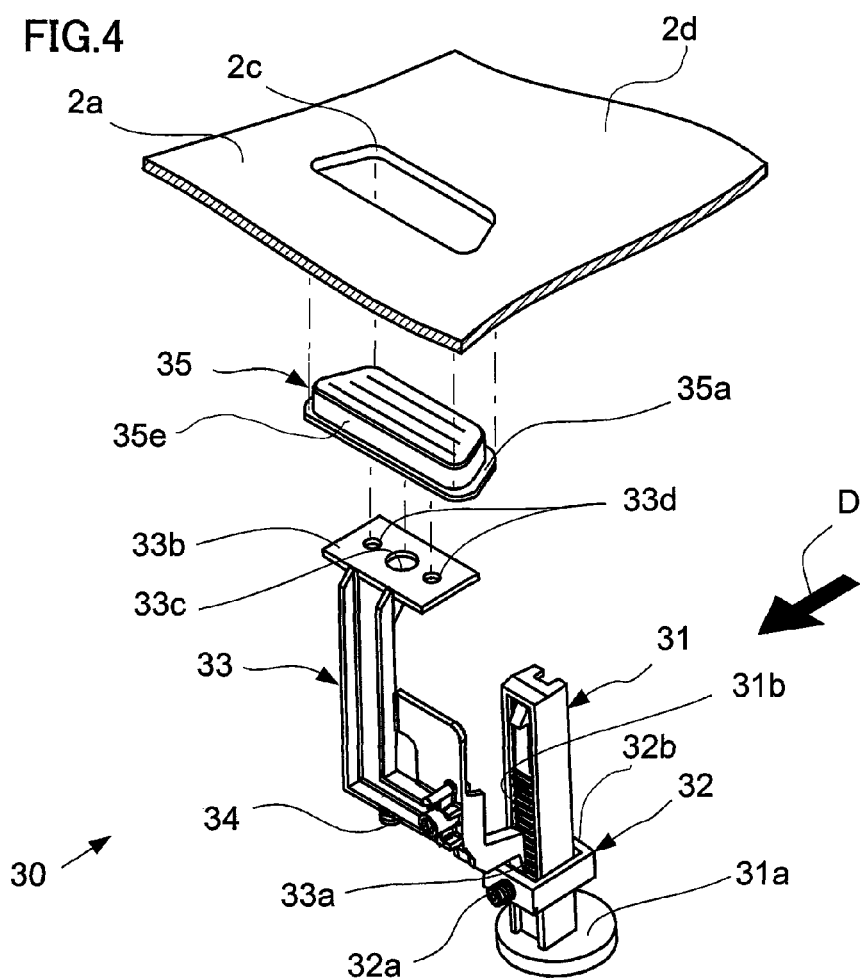
FIG. 4 is an exploded perspective view showing a configuration of an angle adjusting mechanism of the video projector.

As shown in FIG. 3, the angle adjusting mechanism 30 is disposed to take along a front face of the housing 2 in the vicinity of the lamp box 12a. FIG. 4 shows a detailed configuration of the angle adjusting mechanism 30. In FIG. 4, arrow D designates an anterior direction of the video projector 1. The angle adjusting mechanism 30 is comprised of a rod shaped support 31, a lock member 32 to lock the position of the support 31 with respect to the housing 2, a link lever 33 to release the locking of the support 31 by the lock member 32, a coil spring 34 to press the lock member 32 upward, and an operation button 35 which is to be operated by a user to release the locking of the support 31 by the lock member 32. The operation button 35 is disposed above the lock member 32 and the link lever 33 so as to be exposed outside the upper housing member 2a, partially. The operation button 35 has a flange 35a protruded outward and a top end portion 35e. A button hole 2c through which the top end portion 35e of the operation button 35 penetrates is formed on a top face 2d of the upper housing member 2a.

The button hole 2c has substantially the same shape and size as but a little larger than those of the top end portion 35e of the operation button 35. When the top end portion 35e of the operation button 35 is inserted into the button hole 2c, a clearance between the edges of the operation button 35 and the button hole 2c becomes much smaller that that in the conventional video projector, so that visual quality of an appearance of the video projector is increased. The support 31, the lock member 32 and the link lever 33 are required to have high mechanical strength and high rigidity, and temperatures of them may become higher because they are disposed in the vicinity of the light source 11 which serves as a heat source in use of the video projector. Thus, the support 31, the lock member 32 and the link lever 33 are formed of a composite resin, for example. In contrast, the top end portion 35e of the operation button 35 constitutes an appearance of the video projector, so that the operation button 35 is formed of a resin material of a predetermined color suitable for appearance design of the video projector 1. Besides, the materials of these elements are not limited to the described examples. These elements may be formed of the same material such as ABS resin, or the like. Alternatively, the support 31, the lock member 32 and the link lever 33 may be formed of a metal material.

The support 31 is slidably provided on the housing 2 in a direction perpendicular to a bottom 2e of the housing 2, for example. A circular contact 31a is formed at a lower end of the support 31 so that a lower end face of the contact 31a contacts to an installation surface on which the video projector 1 is to be installed. A plurality of hooking protrusions 31b having saw-teeth shape is formed on a face of the support 31 facing the front face of the housing 2. The lock member 32 is provided to move in a direction perpendicular to the front face of the housing 2, that is, the anteroposterior direction of the video projector 1 in a state that the support 31 penetrates through a rectangular opening 32b of the lock member 32. In other words, the moving direction of the lock member 32 is perpendicular to the moving direction of the support 31. A hooking protrusion, which engages with one of the hooking protrusion 31b of the support 31, is formed on an inner wall of the opening 32b of the lock member 32 facing the hooking protrusions 31b. An end of a locking spring 32a such as a coil spring is held on an inner face of a front wall of the housing 2 and the other end of the locking coil is held on the lock member 32, so that the lock member 32 is pressed toward the support 31 with the pressure of the locking spring 32a. Thus, when the hooking protrusion of the lock member 32 engages with one of the hooking protrusions 31b of the support 31, the motion of the support 31 is locked so that a height of the support 31 protruding from the bottom 2e of the housing 2 is maintained. In other words, the position of the support 31 with respect to the housing 2 is locked.

The link lever 33 has an operation wedge 33a at a lower end thereof, which is to be wedges into a clearance between the hooking protrusion of the lock member 32 and one of the hooking protrusions 31b of the support 31 so as to release the locking of the support 31 by the lock member 32. As shown in FIG. 4, the link lever 33 is formed like a crank to have an L-shape in an anterior view, for example. Since the shape of the link lever 33 in the anterior view or in a side view depends on the positions of the support 31 and the operation button 35, the shape of the link lever 33 is not so important in the subject matter of the invention.

A mounting base 33b which is a flat plate, for example, is formed on a top end of the link lever 33. When the upper cover member 2a is attached, the mounting base 33b is disposed in the vicinity of a ceiling of the upper cover member 2a. The mounting base 33b has a circular center through hole 33c formed at a center thereof and a pair of side through holes 33d formed at both sides of the center through hole 33c in a widthwise direction of the video projector 1. The operation button 35 is mounted on the mounting base 33b, details of which will be described.

The link lever 33 is slidably held on the lower housing member 2b in a direction perpendicular to the bottom 2e of the lower housing member 2b. The spring 34 is disposed below a corner of the L-shape of the link lever 33. An end of the spring 34 is held on the bottom 2e of the lower housing member 2b and the other end of the spring 34 is held on the link lever 33, so that the link lever 33 is pressed upward by the pressure of the spring 34. When the upper housing member 2a is attached to the lower housing member 2b with penetrating the top end portion 35e of the operation button 35 through the button hole 2c, the flange 35a of the operation button 35 contacts the ceiling of the upper housing member 2a, so that the spring 34 is compressed a little from a natural state thereof, and thereby, the link lever 33 is pressed upward by the pressure of the spring 34.

Figure 5:
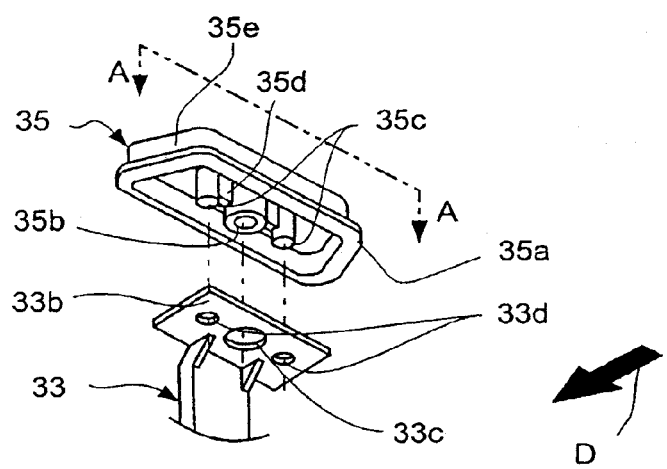
FIG. 5 is an exploded perspective view showing a mounting structure of an operation button on a mounting base of a link lever.
Figure 6A:
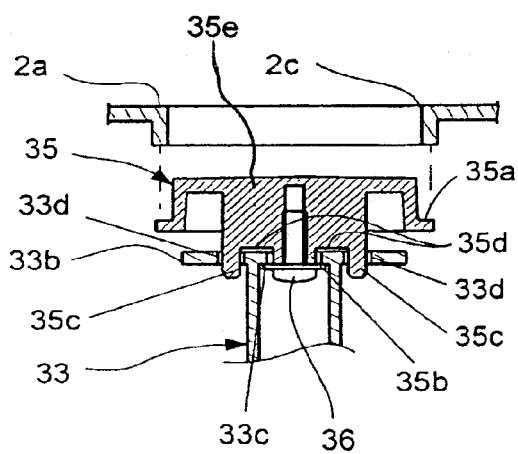
FIG. 6A is a sectional side view showing the mounting structure before attaching an upper housing member.
Figure 6B:
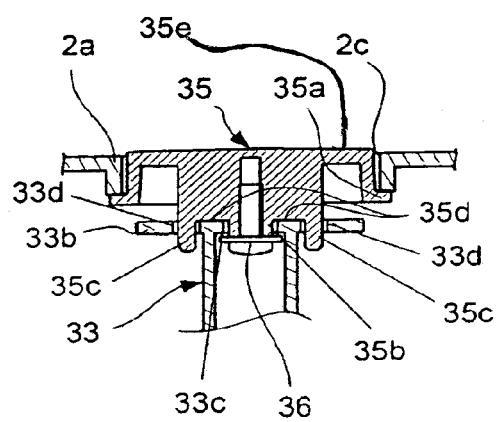
FIG. 6B is a sectional side view showing the mounting structure after attaching the upper housing member.

FIG. 5 and FIGS. 6A and 6B show a mounting structure of the operation button 35 and the mounting base 33b of the link lever 33. Arrow D in FIG. 5 designates the anterior direction of the video projector 1. A center post 35b with a screw hole is formed at a center on a rear face of the operation button 35, and a pair of protrusions 35c having a diameter smaller than that of the center post 35b. In the present embodiment, rear face of the top end portion 35e of the operation button 35 is concaved, and ribs 35d are formed to join the center post 35b and the protrusions 35c so as to increase the mechanical strengths of the center post 35b and the protrusions 35c. The diameter of the center through hole 33c is larger than the outer diameter of the center post 35b, and the diameter of the side through holes 33d are larger than the outer diameter of the protrusions 35c.

As shown in FIGS. 6A and 6b, the center post 35b penetrates the center through hole 33c, the protrusions 35c penetrate the side through holes 33d of the mounting base 33b, and a screw 36 is screwed into the screw hole of the center post 35b intervening the mounting base 33b. The heights of the center post 35b and the protrusions 35c from the ribs 35d is larger than a thickness of the mounting base 33b and a flange diameter of the screw 36 is larger than a diameter of the center through hole 33c of the mounting base 33b, so that the operation member 35 is movably held a little on the mounting base 33b of the link lever 33 in allowances between the inner walls of the center through holes 33c and the side through holes 33d and the outer peripheries of the center post 35b and the protrusions 35c. Alternatively, the operation button 35 may be hooked with the mounting base 33b of the link lever 33 with no screw, if the operation button 35 can be held on the mounting base 33b during the attaching work of the upper housing member 2a on the bottom 2e housing member 2b.

As described above, main elements of the video projector 1 including the optical engine 10 and the controller 20 and the angle adjusting mechanism 30 are mounted on the lower housing member 2b. Then, the upper housing member 2a is attached to the lower housing member 2b from above. Hereupon, the top end portion 35e of the operation button 35 is inserted into the button hole 2c of the upper housing member 2a. Since the operation button 35 is movable with respect to the mounting base 33b in a direction parallel to the top face 2d of the upper housing member 2a on which the button hole 2c is formed (for example, in a horizontal direction), the position of the top end portion 35e of the operation button 35 can be displaced to be adjusted to the position of the button hole 2c, even though the dimensional tolerances of the elements are larger. In other words, the top end portion 35e of the operation button can be inserted into the button hole 2c even when the clearance between the edges of the operation button 35 and the button hole 2c is smaller.

In addition, the flange 35a of the operation button 35 contacts the ceiling of the upper housing member 2a when the top end portion 35e of the operation button is inserted into the button hole 2c, as shown in FIG. 6B. In other words, when the upper housing member 2a is attached to the lower housing member 2b, the operation button 35 and the link lever 33 are displaced downward a little against the pressure of the spring 34. Thus, the operation button 35 is not moved easily with respect to the link lever 33.

When the operation button 35 is pushed down from the state shown in FIG. 6B, the link lever 33 is displaced downward with the operation button 35. At this time, the operation wedge 33a wedges into a gap between the lock member 32 and the support 31, so that the lock member 32 is moved forward against the pressure of the locking spring 32a. When the lock member 32 moves forward, the hooking protrusion of the lock member 32 is disengaged from the hooking protrusion 31b of the support 31, so that the locking of the support 31 by the lock member 32 is released and the support 31 can be slid to protrude downward from the bottom 2e of the housing 2. After sliding the support 31 to protrude a desired height, when the pushing of the operation button 35 is released, the operation wedge 33a is pulled out from the gap between the lock member 32 and the support 31, so that the lock member 32 is moved backward by the pressure of the locking spring 32a. When the lock member 32 moves backward, the hooking protrusion of the lock member 32 engages with one of the hooking protrusions 31b of the support 31, so that the support 31 is locked by the lock member 32. Under such a state that the support 31 is protruded by a desired height from the bottom 2e of the housing 2, when the video projector 1 is installed on an installation surface at three points of the contact 31a of the support 31 and other two contacts provided at both sides in a rear end portion of the housing 2, an angle of an optical axis of the projection lens 18 is adjusted to be a desired angle.

As described above, according to the configuration of the video projector 1 in accordance with the present embodiment, the position of the operation button 35 with respect to the button hole 2c on the upper housing member 2 can be adjusted while the operation button 35 is held on the mounting base 33b of the link lever 33 when the upper housing member 2a is attached to the lower housing member 2b. Thus, the top end portion 35e of the operation button 35 can be inserted into the button hole 2c even when the clearance between the top end portion 35e and the edges of the button hole 2c is narrower, and thereby, visual quantity of the appearance of the video projector 1 can be increased.

Furthermore, since the allowance between the operation button 35 and the housing 2 becomes smaller, friction sounds due to friction contacts of the operation button 35 and the edge of the button hole 2c can be reduced. When the operation button 35 is pushed down, the operation button 35 is not shaky with respect to the housing 2, so that the operationality of the operation button 35 is increased.

Still furthermore, the flange 35a of the operation button 35 contacts the ceiling of the housing 2 with the pressure of the spring 34, so that the operation button 35 is held on the mounting base 33b of the link lever 33 so as not to be displaced hard. Thus, even when the link lever 33 is resonated due to vibrations applied to the video projector 1 from outside or sounds outputted at megavolume from a built-in speaker of the video projector 1, frictional contacts of the top end portion 35e of the operation button 35 and edge of the button hole 2c of the upper housing member 2a rarely occurs, so that frictional sounds are rarely generated.

The present invention is not limited to the configuration as described above, and thus, various modifications are applicable without departing from the scope of the present invention. For example, the optical engine 10 is not limited to the configuration that forms the image with using the color wheel 13 and the DMD 17. It, however, may be configured that the image is formed by passing the lights which are outputted from the light source through liquid crystal display panels, which are arranged corresponding to three primary colors, and synthesizing the lights passing through the liquid crystal display panels subsequently.

The flange 35a of the operation button 35 may be formed partially along the outer periphery of the top end portion 35e. Alternatively, the operation button 35 may have no flange.

Furthermore, the mounting structure of the operation button 35 and the mounting base 33b of the link lever 33a is not limited to the description and illustration of the embodiment described above, if the operation button 35 can be displaced with respect to the link lever 33. Still furthermore, the position of the operation button 35 is not limited to the top face of the housing 2, so that it may be formed on a front face or side face of the housing 2.

Since the present invention is not limited to the description of the above mentioned embodiment and the illustration of the drawings, it is sufficient that a video projector in accordance with an aspect of the present invention comprises: a light source; an image forming unit that forms an image with using image data; a projection lens that projects the image formed by the image forming unit to a screen disposed in front of the video projector; an angle adjusting mechanism that adjusts an angle of an optical axis of the projection lens with respect to an installation surface on which the video projector is installed; and a housing that contains the light source, the image forming unit, the projection lens and the angle adjusting mechanism, and wherein, the housing is comprised of an upper housing member having a button hole formed on a face thereof, and a lower housing member on which the light source, the image forming unit, the projection lens and the angle adjusting mechanism are mounted, and the angle adjusting mechanism is further comprised of a support which can be pulled out downward from a bottom of the lower housing member to protrude a desired height, a lock member to lock movement of the support, a link lever to release locking of the support by the lock member when it is moved, and an operation button having a top end portion inserted into the button hole of the upper housing member and movably held on the link lever in a direction substantially parallel to the face on which the button hole is formed.

According to such a configuration, since the operation button is movable held on the link lever in a direction substantially parallel to the face on which the button hole is formed, for example, a top face of the housing, the position of the top end portion of the operation button can be displaced to be adjusted to the position of the button hole, even though the dimensional tolerances of the elements are larger. In other words, the top end portion of the operation button can be inserted into the button hole even when the clearance between the edges of the operation button and the button hole is smaller. Consequently, a clearance between edges of the operation button and a button hole of a housing into which the operation button is inserted can be made smaller, frictional sounds due to frictional contacts of the operation button and the edge of the button hole can be reduced, a visual quality of the video projector can be increased, and operationality to operate the operation button can be improved.

In the above mentioned configuration, it is preferable that the link lever has a mounting base on which the operation button is movably held at an end thereof; the mounting base is a flat plate having at least one hole; and the operation member has at least one protrusion on a rear face, which has a diameter smaller than the hole and penetrates through the hole.

Furthermore, it is preferable that the hole of the mounting base is a through hole; and the protrusion of the operation member has a screw hole, and a screw having a flange diameter is larger than a diameter of the hole of the mounting base is screwed to the screw hole intervening the mounting base enabling the operation member movably held on the mounting base of the link lever.

Alternatively, it is preferable that the mounting base has a center through hole formed at a center thereof and a pair of side trough holes formed at both sides of the center through hole in a widthwise direction of the video projector; the operation button has a center post with a screw hole formed at a center on a rear face of the operation button, and a pair of protrusions having a diameter smaller than that of the center post; a diameter of the center through hole is larger than an outer diameter of the center post, and a diameter of the side through holes is larger than an outer diameter of the protrusions; rear face of the top end portion of the operation button is concaved, and ribs are formed to join the center post and the protrusions so as to increase the mechanical strengths of the center post and the protrusions; the center post penetrates the center through hole, the protrusions penetrate the side through holes of the mounting base, and a screw is screwed into the screw hole of the center post intervening the mounting base; and heights of the center post and the protrusions from the ribs is larger than a thickness of the mounting base and a flange diameter of the screw is larger than a diameter of the center through hole of the mounting base, so that the operation member is movably held on the mounting base of the link lever.

This application is based on Japanese patent application 2006-145617 filed May 25, 2006 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A video projector comprising:
a light source;
an image forming unit that forms an image using image data;
a projection lens that projects the image formed by the image forming unit to a screen disposed in front of the video projector;
an angle adjusting mechanism that adjusts an angle of an optical axis of the projection lens with respect to an installation surface on which the video projector is installed; and
a housing that contains the light source, the image forming unit, the projection lens and the angle adjusting mechanism, wherein
the housing is comprised of an upper housing member having a button hole formed on a face thereof, and a lower housing member on which the light source, the image forming unit, the projection lens and the angle adjusting mechanism are mounted;
the angle adjusting mechanism is further comprised of a support which can be pulled out downward from a bottom of the lower housing member to protrude at a desired height, a lock member to lock movement of the support, a link lever to release locking of the support by the lock member when the link lever is moved, and an operation button having a top end portion inserted into the button hole of the upper housing member and movably held on the link lever in a direction substantially parallel to the face on which the button hole is formed.

2. The video projector in accordance with claim 1, wherein
the link lever has a mounting base on which the operation button is movably held at an end thereof;
the mounting base is a flat plate having at least one hole; and the operation button has at least one protrusion on a rear face, which has a diameter smaller than the hole and penetrates through the hole.

3. The video projector in accordance with claim 2, wherein the hole of the mounting base is a through hole; and the protrusion of the operation button has a screw hole, and a screw having a flange diameter is larger than a diameter of the hole of the mounting base is screwed to the screw hole intervening the mounting base enabling the operation button movably held on the mounting base of the link lever.

4. The video projector in accordance with claim 2, wherein the at least one hole of the mounting base includes a center through hole formed at a center thereof and a pair of side through holes formed at both sides of the center through hole in a widthwise direction of the video projector;

the at least one protrusion of the operation button includes a center post with a screw hole formed at a center on a rear face of the operation button, and a pair of protrusions having a diameter smaller than that of the center post;

a diameter of the center through hole is larger than an outer diameter of the center post, and a diameter of the side through holes is larger than an outer diameter of the protrusions;

a rear face of the top end portion of the operation button is concaved, and ribs are formed to join the center post and the protrusions so as to increase the mechanical strengths of the center post and the protrusions;

the center post penetrates the center through hole, the protrusions penetrate the side through holes of the mounting base, and a screw is screwed into the screw hole of the center post intervening the mounting base; and heights of the center post and the protrusions from the ribs is larger than a thickness of the mounting base and a flange diameter of the screw is larger than a diameter of the center through hole of the mounting base, so that the operation button is movably held on the mounting base of the link lever.

* * * * *